M. F. HILL.
SHOVEL AND BRUSH SCRAPER ATTACHMENT.
APPLICATION FILED FEB. 10, 1915.
1,173,512.
Patented Feb. 29, 1916.
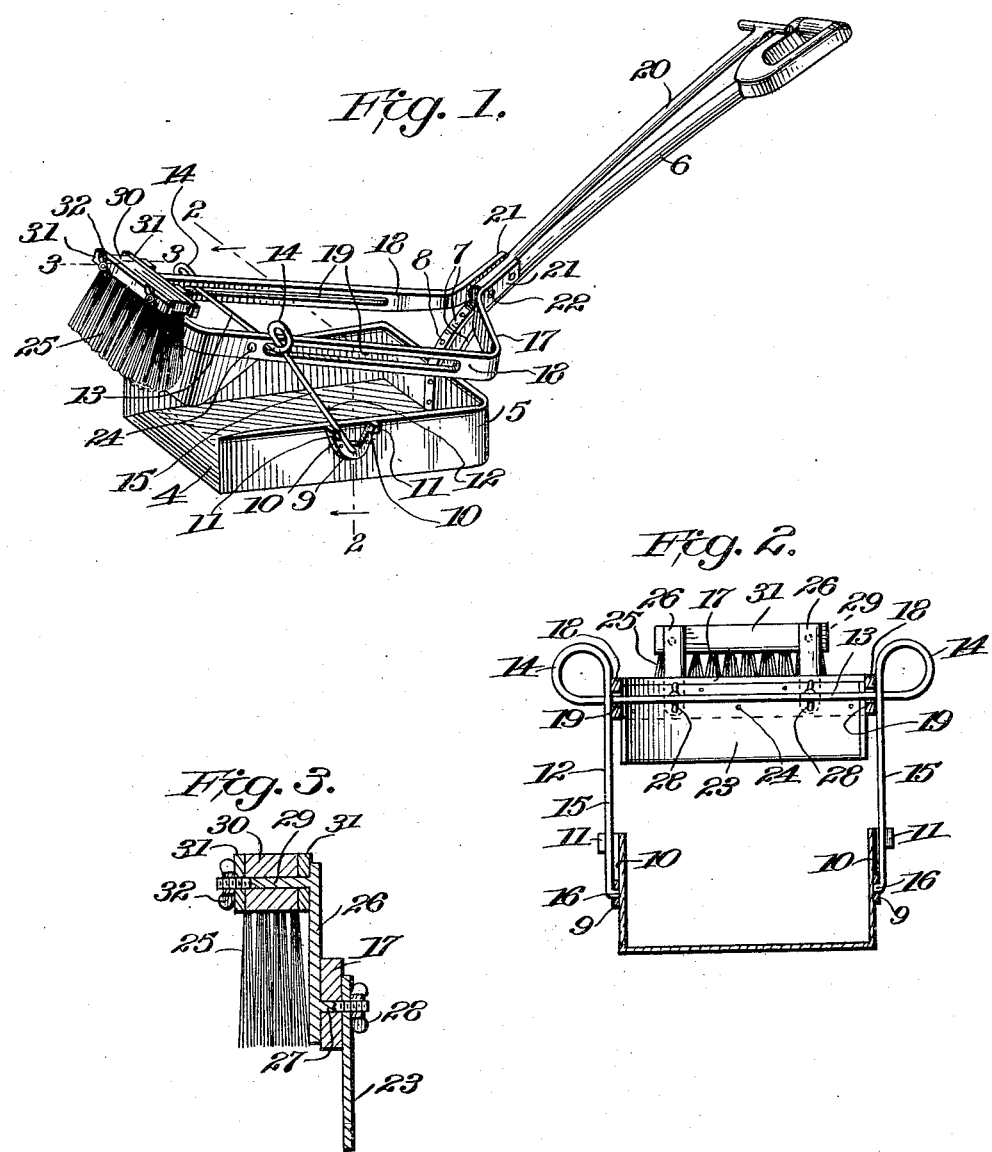
Witnesses
M. A. Jones
B. H. Allen
Inventor,
Mortimer F. Hill,
By Frank Fuller Attorneys

UNITED STATES PATENT OFFICE.

MORTIMER F. HILL, OF EAST ST. LOUIS, ILLINOIS.

SHOVEL AND BRUSH SCRAPER ATTACHMENT.

1,173,512. Specification of Letters Patent. Patented Feb. 29, 1916.

Application filed February 10, 1915. Serial No. 7,452.

*To all whom it may concern:*

Be it known that I, MORTIMER F. HILL, a citizen of the United States, residing at East St. Louis, in the county of St. Clair and State of Illinois, have invented certain new and useful Improvements in Shovel and Brush Scraper Attachments, of which the following is a specification.

My invention relates to a combination shovel and loading device therefor and it aims to provide an effective device of this nature capable of every use as a shovel generally but particularly adapted for use where matter is to be periodically removed, and to provide the shovel with a means attached thereto which is operable to brush, scrape or load the material onto the shovel.

More specifically I aim to provide a shovel having a frame mounted thereon for sliding and pivotal movement and adapted to carry a brush or scraper or both.

With the foregoing and additional objects in view, which additional objects will hereinafter appear as the description progresses, the invention has been embodied in one preferred form as illustrated in the accompanying drawings, wherein:

Figure 1 is a perspective view of the complete device; Fig. 2 is a cross sectional view on the line 2—2 of Fig. 1, but on an enlarged scale, and Fig. 3 is a cross sectional view on the line 3—3 of Fig. 1, but on an enlarged scale.

Referring specifically to the drawings, the shovel shown consists of a pan 4, preferably having a rather deep edge wall 5 on three sides thereof, and a handle 6 of any preferred form. The handle is preferably attached to the wall 5 as by means of metal straps 7 and rivets or bolts 8.

My improvements are capable of use in connection with various types of shovels and it is therefore to be understood that the form illustrated and described is merely conventional.

On opposite side portions of wall 5 are fastened bearing plates 9 having upwardly diverging arms 10 provided with outwardly projecting stop lugs 11 at their upper extremity. These plates 9 are adapted to pivotally mount a supporting structure generally designated 12. This structure 12 has a horizontally disposed fulcrum rod 13, coils 14 at the ends thereof and side arms 15 continuing from the coils. Extending inwardly and toward each other, from the arms 15 are lugs 16 which enter suitable apertures in the plates 9 in order to mount the structure 12 for pivotal movement (limited by lugs 11) when loading mechanism later to be described is moved relatively to the pan in opposite directions. This structure 12 is preferably formed of a single strand of stiff resilient wire so that the arms 15 may be spread or moved apart to facilitate attachment and detachment of the lugs 16 with the plates 9. The coils at 14 serve to increase the spring action of the arms 15.

A substantially rectangular frame 17 which may be formed from a strap of bendable metal is disposed above the pan 4 and has in its side portions, which may be designated 18, suitable elongated slots 19 through which the fulcrum rod 13 passes and on which the frame 17 is slidably and turnably mounted. This frame 17 is provided with a handle 20 fastened between extensions 21 of frame 17 as by means of rivets or bolts 22. A depending scraper blade 23 may be disposed to bridge the front end of frame 17 and extend partly along the side portions 18, and be riveted or otherwise secured to the frame 17 as at 24. In addition, the frame 17 may carry a suitable brush generally designated 25. This brush 25 is supported from the frame by means of crank elements 26 having shanks integral therewith designated 27 adapted to extend through and beyond one end of the frame 17 and the scraper 23 and beyond the scraper 23 receive nuts 28, preferably of the wing type so that they may be operated manually. Crank plates 26 also have integral therewith, shanks 29 extending in an opposite direction to the shanks 27, and through the brush head which may be designated 30. On both sides of the brush head 30 wearing plates 31 may be interposed and may have apertures through which the shanks 29 pass. Beyond the outermost plate 31, a nut 32 preferably of the wing type, engages the shank 29. Shanks 27 serve to pivot the cranks 26 to frame 17 for vertical movement and the shanks 29 serve to pivotally connect the cranks to the brush 25.

In use, the shovel as usual is placed adjacent the material to be removed. In lieu of brushing the material onto the pan 4 by means of a brush separate from the shovel, the handle 20 may be tilted forwardly with one hand while the other hand securely holds the handle 6. When the handle 20 is moved forwardly, it may simultaneously be tilted so as to bring the scraper and brush into contact with the ground whereupon the handle 20 is drawn toward the operator so as to load or scrape and brush the material onto pan 4. It will be seen that the rod 13 forms a fulcrum for the frame 17 and that the lugs 11 form stops to limit the movements of the structure 12. When the frame 17 is pushed forward it slides and pivots on rod 13 and the structure 12 swings forward and the arms 15 engage one set of lugs 11 and when the frame 17 is drawn toward the operator, frame 17 pivots but slides in the opposite direction on the rod 13 and structure 12 also swings in the direction of movement of the frame and the arms 15 engage the other lugs 11. These lugs serve to rigidly support the structure 12 when the frame 17 moves in opposite directions.

The height of the brush 25 may be varied by loosening the nuts 28 and 32, and moving the brush vertically with cranks 26 turning from shanks 27 and 29 as pivots. After proper adjustment of the brush, the nuts 28 and 32 should be again tightened.

Since the arms 15 are readily disengageable from the bearings 9, and since the structure 12 supports the loading mechanism as a whole, this loading mechanism may be readily detached from the shovel to permit use of the shovel in the usual manner.

Both the scraper 23 and the brush 25 are loading elements. Although it is preferable to employ the two loading elements shown, it is clear that one of them may be dispensed with, if desired.

Inasmuch as only the preferred embodiment of the invention has been illustrated and described, it is to be understood that changes in the details may be resorted to without departing from the spirit and scope of the invention.

I claim:

1. In combination with a receiving pan, loading mechanism therefor, movable means to connect said loading mechanism to the pan, said loading mechanism being slidable along and fulcrumed directly on said means, and means to brace the said means while the said mechanism fulcrums and slides thereon.

2. In combination with a receiving pan, loading mechanism having a frame, said frame being provided with a side member having an elongated slot therein, a supporting structure for said frame pivotally connected to the pan and said supporting structure extending into said elongated slot and said frame fulcruming on and being slidable along said supporting structure.

3. In combination with a receiving pan, a supporting structure having a side arm and a fulcrum portion, a bearing on said pan in which said side arm is pivotally mounted, lugs carried by said bearing to limit the movement of said arm in opposite directions, a frame, said frame being provided with an elongated slot through which the fulcrum portion extends to mount the frame for sliding movement and pivotal movement, loading means carried by the frame and a handle carried by said frame.

In testimony whereof I affix my signature in presence of two witnesses.

MORTIMER F. HILL.

Witnesses:
ROBERT VOELKER,
JAS. K. EWING.